United States Patent [19]
Kloppenburg et al.

[11] Patent Number: 5,820,907
[45] Date of Patent: Oct. 13, 1998

[54] APPARATUS AND A METHOD FOR MANUFACTURING BAKED MOLDED PRODUCTS

[75] Inventors: Wiebe Kloppenburg, Deventer; Johan Hendrik Adolf Arentsen, Lochem, both of Netherlands

[73] Assignee: Suntray B.V., Netherlands

[21] Appl. No.: 549,738

[22] PCT Filed: Mar. 6, 1995

[86] PCT No.: PCT/NL95/00083

§ 371 Date: Mar. 5, 1996

§ 102(e) Date: Mar. 5, 1996

[87] PCT Pub. No.: WO95/24128

PCT Pub. Date: Sep. 14, 1995

[30] Foreign Application Priority Data

Mar. 7, 1994 [NL] Netherlands .......................... 9400353

[51] Int. Cl.[6] .................. A21B 1/42; A21B 5/02
[52] U.S. Cl. .......... 426/391; 426/505; 426/512; 426/523; 99/353; 99/380; 99/426
[58] Field of Search .................... 426/138, 391, 426/496, 505, 512, 523; 99/353, 380, 382, 383, 426, 442

[56] References Cited

U.S. PATENT DOCUMENTS

| 3,461,823 | 8/1969 | Greco | 99/383 |
| 3,978,238 | 8/1976 | Frey et al. | 99/380 |
| 4,364,308 | 12/1982 | John et al. | 99/380 |
| 4,973,240 | 11/1990 | Reilly | 99/353 |
| 5,336,511 | 8/1994 | Der Beer | 99/383 |
| 5,463,939 | 11/1995 | Koletnik et al. | 99/353 |

*Primary Examiner*—Stanley S. Silverman
*Assistant Examiner*—Theodore M. Green
*Attorney, Agent, or Firm*—Michaelson & Wallace; Peter L. Michaelson; John C. Pokotylo

[57] ABSTRACT

The invention relates to a baking mold for manufacturing moldings, comprising a lower baking section mounted on a lower arm and an upper baking section mounted on an upper arm, wherein the baking sections, in the closed condition of the baking mold and in superposed condition, define at least one baking form, and wherein during use the upper arm can be fixedly connected with the lower arm. At least one of the baking sections is movably connected with the relevant arm, and pressure means are included for pressing under bias on the baking section in the closed condition of the baking mold and thereby closing the baking form at least during normal use.

16 Claims, 4 Drawing Sheets

APPARATUS AND A METHOD FOR MANUFACTURING BAKED MOLDED PRODUCTS

BACKGROUND OF THE INVENTION

The invention relates to a baking mold for manufacturing moldings and comprising a lower baking section mounted on a lower arm and an upper baking section mounted on an upper arm. The baking sections, in superposed position in a closed position of the baking mold, define at least one baking form.

For the manufacture of baked moldings, such as, for instance, wafers or like dough products, baking molds which comprise two baking platens or like baking sections which fit onto each other are usually used. The baking platens are each fixedly connected with a closing arm, so that the baking mold can simply be closed by moving the closing arms towards each other. Between the baking platens, an amount of dough is provided. The baking platens are then pressed onto each other and are passed into a wafer baking oven. After the wafers have been baked, they are removed from between the baking platens and the baking mold is filled with dough again.

During the baking of the moldings, in particular as a result of moisture issuing from the dough, an increase in pressure arises between the baking platens, so that the baking platens are pressed apart slightly. In addition, the heating of the mold parts may cause the baking platens and the closing arms to deform. Such deformation also creates more space between the land areas of the baking platens.

The use of baking molds is advantageous because wafers can be baked in a semi-continuous or continuous process, so that a high production of a constant quality can be obtained. During the baking of wafers, the pressures arising between the baking platens and the temperatures required for baking the wafers are of such a nature that the closing force required for the baking mold is relatively low. Moreover, during the baking of the wafers, the dough can, to some extent, flow away between the baking platens, so that any overpressure is prevented. After baking, the wafers are post-treated, for instance by cutting, applying a coating and stacking, with the redundant material being cut off. As a result, at least on the sides of the wafers, the baking skin is damaged. In the manufacture of wafers in this manner, a relatively large space between the land areas of the baking platens is allowable and often even desirable.

When baking moldings which must be ready directly upon removal from the baking mold, i.e. in the case where any aftertreatment of the moldings should be eliminated, the closure of the baking mold must be such that the baking sections define a closed baking form. It must be impossible for the dough to flow or be pressed between the land areas of the baking sections. In particular, when using dough which is introduced into the baking mold as a suspension of low viscosity, such as dough based on starch having (in view of the necessary flow properties) a high moisture content, the maximum distance between the land areas should therefore be kept to a minimum. Any space between the land areas serves only to allow the escape of steam which has evolved within the baking mold during baking.

In particular when baking biodegradable moldings, such as for instance moldings manufactured on the basis of a starch product, it is of particular importance that the closed baking skin of the molding upon baking not be damaged by any aftertreatment. The reason is that a fully closed, intact baking skin prevents the premature onset of the biological degradation process and thereby ensures that the desired mechanical strength of the molding is maintained for a prolonged time. Moreover, thus in a simple and advantageous manner, a hygienic molding having a visually and tactually pleasant appearance is directly obtained.

In the known baking mold, the closing arms comprise stiffening ribs which absorb the pressures arising and at least partially prevent deformations, so that, in principle, the baking mold remains closed during the baking process. When using the known baking mold at relatively high temperatures and pressures, these stiffening ribs, to provide sufficient closing force, must be made of such heavy and rigid construction that the stresses arising in the baking mold become unacceptably high, a high risk of fracture exists and the closure of the mold requires much force. Moreover, a baking mold designed in this manner is heavy and difficult to handle and the further equipment required for the baking process must be made of a correspondingly heavy construction. Further, heating a heavy baking mold requires relatively much energy.

SUMMARY OF THE INVENTION

To avoid the above-mentioned disadvantages while maintaining the advantages of the known baking mold, the baking mold according to the invention is characterized in that at least one of the baking sections is movably connected to the corresponding arm, and pressure means are included for providing a pressing force on the baking sections in the closed condition of the baking mold and thus closing the baking form at least during normal use.

Since at least one baking section is movably connected with the adjacent arm, while the baking sections are subject to a bias (e.g., due to potential energy stored in a spring) in the closing direction, in the baking mold according to the invention, in closed condition during normal use, land areas of the baking sections are fittingly pressed into the closed position, even if one or both closing arms or other mold parts are slightly deformed as a result of the operating temperature and the pressures arising in the baking mold. Moreover, as a result of the bias and the movability of at least one baking section, differences in thickness and other deviations of the baking sections, for instance due to wear, are simply compensated for, so that during use, a suitable position of the land areas of the baking sections relative to each other is obtained.

As a consequence of the movability of one baking section relative to the corresponding arm and the bias applied, deformations can arise in the baking mold without affecting the closure of the baking mold. This means that particularly the closing arms, but also the baking sections, can be made of lighter construction than in the known baking mold, so that the stresses arising in the different mold parts during use are reduced considerably and the risk of fracture is substantially eliminated. Moreover, the baking mold according to the invention can be made of considerably lighter construction in its entirety, so that the oven to be used can also be of lighter design and the baking mold is easier to handle, with the associated advantages.

In further elaboration of the invention, the bias is adjustable by means of the pressure means, which adjustment is preferably possible at least at room temperature. As a consequence of the adjustability of the bias, it is possible to control the closing force which is exerted on the baking sections, depending, for instance, on (i) the expected maximum dough mass in the baking form, at any rate under normal operating conditions, (ii) the maximum temperature and pressure during the baking process, (iii) the associated expected deformations of the mold parts such as the closing arms and the baking sections, and (iv) the maximum allowable space between the land areas of the baking sections. Thus, the optimum closing force can always be set, for instance in the production of different moldings and when using baking sections of different dimensions and at different operating temperatures. Setting the bias at room temperature then has an important advantage in that no special provisions need to be made for the protection of the persons who are to implement the setting operation.

According to a preferred embodiment of the baking mold according to the invention, each pressure means comprises a number of superposed cup springs and a pressure member, while each pressure member can be pressed against the corresponding baking section by means of the springs. Each pressure means comprises an adjusting ring and an adjusting sleeve. The adjusting sleeve is fixedly connected to one of the closing arms. The pressure member comprises a shank extending through the adjusting ring. The springs are confined around the shank between the pressure member and the adjusting ring. The pressure member is movable relative to the adjusting sleeve such that the space occupied by the springs can thereby be increased or reduced. The adjusting ring is movable within the adjusting sleeve, such that the distance between the corresponding baking section and the adjusting ring can thereby be increased or reduced.

With this embodiment of the baking mold according to the invention, at least a part of the bias applied to the relevant baking section can be set by displacement of the adjusting ring within the adjusting sleeve while the pressure member is in abutment with the baking section. The stacked cup springs are thereby compressed to a greater or lesser extent between the pressure member and the adjusting ring. This provides the so-called "set-up" bias. If a greater pressure is exerted on the baking section in the direction of the relevant arm than is exerted by the springs in the pressure means, the baking section is displaced in the direction of the arm, whereby the springs are further compressed. Thus, at an appropriate setting of the bias, an optimum closing force is obtained.

In further elaboration of this embodiment, at the top of the adjusting ring, an upright collar is arranged concentrically relative to the shank. The shank is so long that the top end thereof is approximately level with the upper end of the adjusting ring when the number of springs in question are in relaxed condition. Placed on the collar is a closing ring through which an adjustment bolt has been inserted. The adjustment bolt can be connected to the top of the shank. Within the collar, between the adjusting ring and the closing ring, a filler ring can be included having a central opening which is smaller than the diameter of the shank but which permits the adjustment bolt to pass.

When tightening the adjustment bolt, the shank is drawn in the direction of the closing ring, until the filler ring is clamped between the closing ring and the end of the shank. Simultaneously, the springs are slightly compressed, so that a premounting bias is provided in the pressure means. The difference between the height of the collar and the thickness of the filler ring is determinative of this premounting bias: if the filler ring has a thickness which corresponds to the height of the collar, then the premounting bias is minimal; if the filler ring is omitted, the premounting bias is maximal. The premounting bias has the advantage that it is simple to provide and is simple to set, even when the pressure means has not yet been arranged in the mold. Moreover, the premounting bias remains present in the pressure means, even after repeated opening of the mold.

In an alternative embodiment of the baking mold according to the invention, the pressure means comprise at least one elastically deformable spring arm. During use, this spring arm is connected, by at least one end, to the lower and/or upper arm. A central portion of the spring arm bears on a side of a baking section remote from the baking form. The spring arm is slightly deformed such that the spring arm applies a bias to the baking section in the closing direction of the baking mold. This embodiment of the baking mold according to the invention is of particularly simple construction. The bias is determined by the extent of deformation of the spring arm.

With the known baking mold, the baking sections which define the baking form are brought into a fixed position relative to each other and thus maintained by means of the closing arms and a mold closing mechanism which fixes the closing arms in a closed position. In case of an excessive pressure between the two baking sections, for instance as a result of the introduction of dough into a baking mold which has not been emptied, the known baking mold will spring open by failure of the mold closing mechanism, or one of the mold parts will break. Moreover, if one of the land areas is soiled, the mold cannot be closed. When using a travelling-tray oven, a circular oven or a comparable type of oven where a large number of baking molds are successively passed through the oven, this is particularly disadvantageous because, apart from any damage to the baking mold, the baking molds will jam in the oven as a result. As a consequence, the moldings in the baking molds which are situated in the oven will burn, so that all baking molds in question will have to be cleaned before they can be used again. Moreover, before repair, replacement and/or cleaning, the oven and the baking molds will first have to cool to the point where the baking molds can be handled. This leads to major economic loss.

It is therefore particularly advantageous when the baking mold according to the invention comprises an overpressure protection which is so arranged that if, in the closed condition of the baking mold, the pressure between the baking sections exceeds a pre-set value, the baking sections are pressed apart without the baking mold thereby being opened. Because at least one baking section is movably connected, the baking sections, provided the bias is properly set, can be pushed apart in case of overpressure without the mold parts thereby being pressed apart. Further, in case of soiling of a land area, the mold can still be closed. Therefore, the baking mold in question can be normally passed further through the oven and into a removal station. When opening the baking mold for removing the baked moldings, the superfilled or soiled baking mold too can be emptied before it is filled again with dough and passed back into the oven. Neither the oven nor the baking process need be stopped at any time during this operation.

It is preferred that, in the baking mold according to the invention, the movability of each baking section relative to the adjacent arm is limited, at least in the closing direction, by a stroke limiter. The stroke limiter is arranged so that, even in the opened condition of the mold, the pressure means transmit a part of the bias to the relevant baking section. In an open position of the baking mold, each movable baking section will move maximally in the direction remote from the corresponding arm to obtain a minimal stress in the pressure means. When closing the mold, each movable baking section makes a closing stroke for achieving the desired closing tension. By limiting this stroke by means of a stroke limiter such that each movable baking section cannot move away maximally from the corresponding arm, a part of the set-up bias remains present in the pressure means. Consequently, for closing the mold, much force needs to be applied at least for a shorter time. Moreover the life of the different mold and oven parts is prolonged due to loads varying less in magnitude, which is of major importance in particular at the conventional operating temperatures. The use of such a stroke limiter moreover has the advantage that the positioning of the two baking sections relative to each other is rendered possible in a simpler manner, for instance by means of centering pins. In fact, the stroke limiter makes it possible to suspend the baking sections for slight movement in the plane perpendicular to the closing direction as well, so that undue wear of the centering pins and the baking sections is moreover avoided.

The invention further relates to a method for manufacturing moldings based on a starch product utilizing a baking mold according to the invention, in which, in an at least semicontinuous process, a dough based on a starch product is prepared and introduced into an opened baking mold, the baking mold is closed and is passed into or through an oven, so that the molding is baked, the baked molding is removed from the baking form and the baking mold is filled again. In the method according to the invention, a bias in the closing direction is applied to at least one of the baking sections for closing the baking mold.

In further elaboration, in the method according to the invention it is preferred that, before use, the bias desired during use for closing the baking mold is set such that, at least when a maximum allowable pressure between the baking sections is exceeded, the baking sections are pressed apart without damage to the baking mold and/or oven parts, such that no overpressure arises in the baking mold and the such that baking mold is not prematurely opened.

To clarify the invention, exemplary embodiments of a baking mold and a method for manufacturing moldings based on a starch product utilizing a baking mold according to the invention will be described with reference to the drawings.

DETAILED DESCRIPTION

When using baking molds for (semi)continuously manufacturing baked moldings, such as wafers and dish parts, an amount of dough is introduced into the baking mold. Next, the baking mold is passed into an oven in order to render the dough "done" in the desired form. Then the baking mold is passed out of the oven and the baked molding is removed from the mold, whereafter the entire process is repeated in a new cycle.

Figure 1:
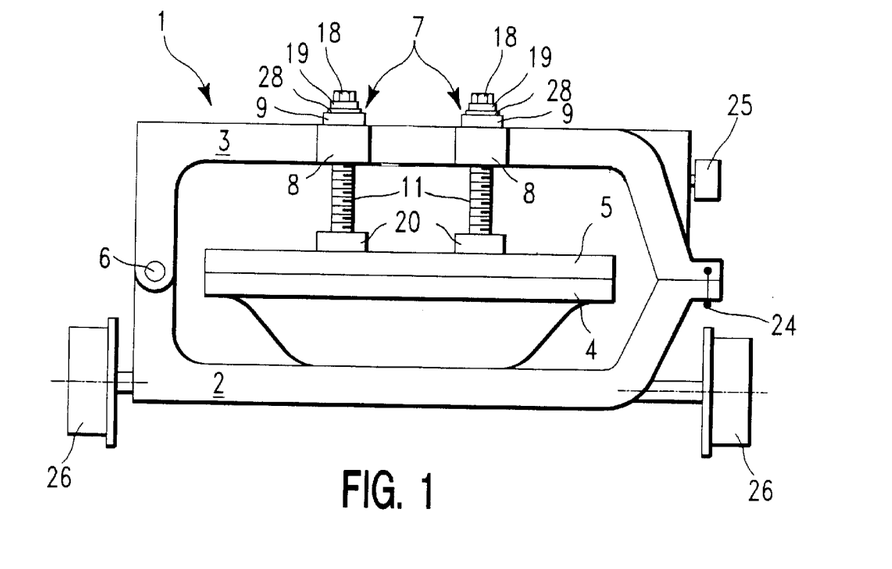
FIG. 1 shows, in side elevation, a baking mold according to the invention in closed position.
Figure 2:
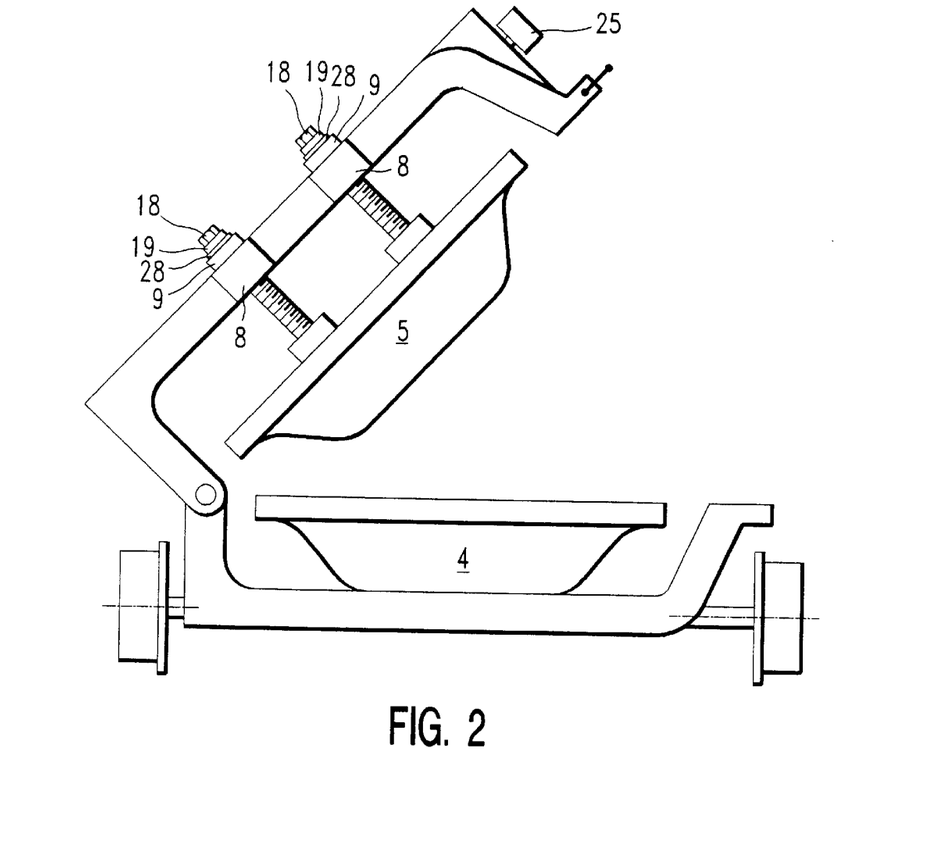
FIG. 2 shows the baking mold according to FIG. 1 in opened position.

The baking mold 1 as shown in FIGS. 1 and 2 comprises a lower arm 2 and an upper arm 3, a lower baking section 4 and an upper baking section 5. The upper arm 3 can be swung relative to the lower arm 2 about a pivot 6, from the closed position shown in FIG. 1 to the opened position shown in FIG. 2 vice versa. The upper baking section 5 is movably connected to the upper arm 3 by means of a number (e.g., 6) of pressure means 7. The lower baking section 4, in the embodiment shown in FIGS. 1 and 2, is fixedly connected to the lower arm 2 but may also be connected thereto via pressure means 7. In the closed position of the baking mold 1 shown in FIG. 1, the pressure means 7 exert such a force on the baking section 5 that the baking form formed by the two baking sections 5, 6 is closed and remains closed, in any case during normal use.

Figure 3:
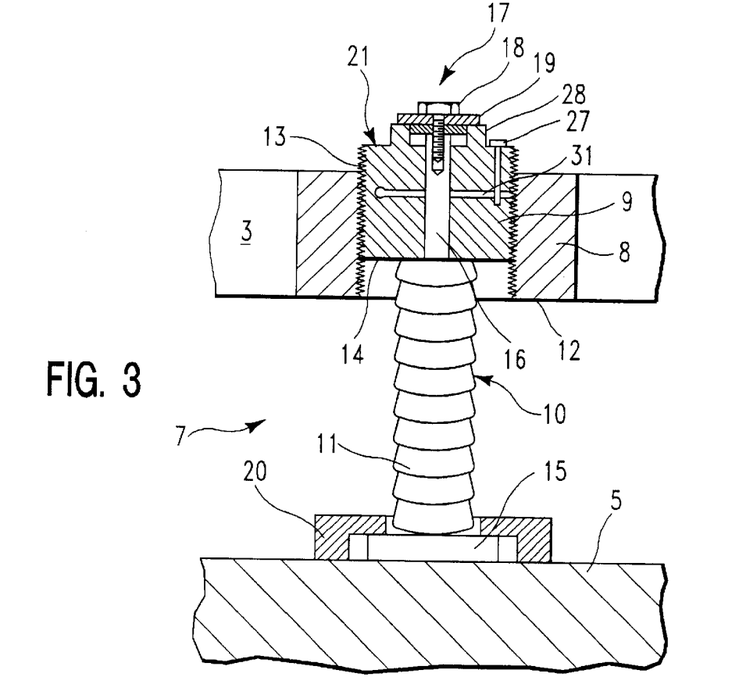
FIG. 3 shows a pressure means according to the invention in partial section, with the baking mold in opened position.
Figure 4:
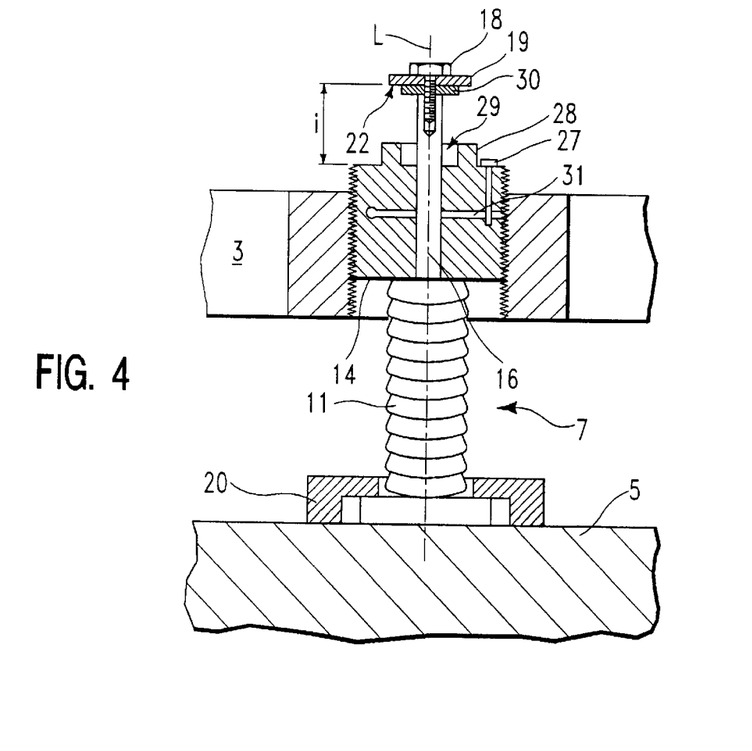
FIG. 4 shows a pressure means according to the invention in partial section, with the baking mold in closed position.

FIGS. 3 and 4 show, in partly sectional view, a pressure means 7, which comprises an adjusting sleeve 8, an adjusting ring 9, a pressure member 10 and a number of cup springs 11. The adjusting sleeve 8 is fixedly connected to an arm 3 of the baking mold 1, and is provided with internal screw thread 12. The adjusting ring 9 is provided with external screw thread 13 which can cooperate with the internal screw thread 12 of the adjusting sleeve 8. Thus the adjusting ring 9 can be turned within the adjusting sleeve 8 such that the end face 14 of the adjusting ring 9 proximal to the baking section 5 can be moved in the direction of the relevant baking section 5, as well as in the opposite direction. The adjusting ring 9 is provided with a locking slot 31 which extends transversely to the longitudinal direction of the adjusting ring 9 and preferably has a greater depth than the radius of the adjusting ring 9. Fitted from the top of the adjusting ring 9 is a locking screw 27, by means of which the height of the locking slot 31 can be adjusted.

The pressure member 10 comprises a pressure plate 15 and a shank 16 which extends from the pressure plate 15 through the adjusting ring 9 along the centerline L of the adjusting sleeve 8 and adjusting ring 9. Between the pressure plate 15 and the end face 14 of the adjusting ring 9 proximal to the pressure plate 15, an appropriate number of stacked cup springs 11 are arranged over the shank 16. The shank 16 has a length such that at the given number of mounted, tension-free cup springs 11 and with the shank 16 slipped through the adjusting ring 9, the end 17 of the shank 16 remote from the pressure plate 15 is approximately level with the upper end 21 of the adjusting ring 9. On its upper end 21, the adjusting ring 9 comprises an upright collar 28 which on the outside defines a square and on the inside is provided with a recess 29 provided concentrically relative to the shank. A filler ring 30 is placeable in the recess 29 and has a central opening which is smaller than the section of the end 17 of the shank 16 but which can permit an adjustment bolt 18 to pass. By means of the adjustment bolt 18, a closing ring 19 is mounted on the shank 16, such that the shank 16 cannot be removed from the adjusting ring 9 without removing the closing ring 19 or the pressure plate 15. The filler ring 30 is locked within the collar 28 between the shank 16 and the closing ring 19, and the closing ring 19 has a cross-section such that, in mounted condition, it can abut against the top of the collar 28.

When tightening the adjustment bolt 18, the end 17 of the shank 16 is drawn in the direction of the closing ring 19, until the filler ring 30 is clamped between them. At the same time the cup springs 11 are thereby compressed between the adjusting ring 9 and the pressure plate 15, so that a premounting bias (e.g., potential energy stored in the compressed spring) in the pressure means 7 is obtained which is maintained all the time. The difference in the depth of the recess 29 and the thickness of the filler ring 30 is a direct measure for this premounting bias. When using, for instance, a spring package having a spring constant of 500N/mm and the recess 29 has a depth of 10 mm, the premounting bias can vary between 0N (when omitting the filler ring 30) and 5000N (when mounting a filler ring 30 of a thickness of 10 mm).

The pressure plate 15 is locked in a closing bearing 20 which is fixedly connected with the baking section 5. The closing bearing 20 may optionally allow rotation of the pressure plate 15 about the centerline L of the shank 16 but prevents translating movements of the pressure plate 15 relative to the baking section 5.

Referring back to FIG. 1, the baking mold comprises at least two sets of rollers 26 by which the baking mold can be moved over a set of guiding rails (not shown) extending, for instance, through an oven, while on the side of the closing mechanism 24, represented in highly simplified manner in the drawing, at the top thereof, a closing roller 25 is arranged, by which the baking mold can be guided along a closing rail, fixedly arranged in the oven, for the purpose of opening and closing the baking mold.

In the known baking molds, the two baking sections are pressed tightly against each other during use, always at the same closing force. Because the baking sections are fixedly connected with the mold parts that provide the closing force, deformations of these mold parts, for instance as a consequence of heating, excessive pressures in the mold, wear of mold components or deviations of a different kind, will have a direct influence on the closure of the two baking sections, i.e. on the relative location of the land areas of the baking sections and hence on the quality of the end product.

If the moldings removed from the mold may be aftertreated, deviations in the mold closure need not always lead to problems, although aftertreatments will generally render the final products more expensive and often detract from the appearance of the product. However, in the case of products which may not be aftertreated, such as, for instance, biodegradable moldings, the closure of the mold should be guaranteed within particularly small tolerances. With biodegradable products it is necessary that the baking skin remain intact and closed until use or preferably even until after use, since the baking skin protects the product against (premature) disintegration and hence against decline of the mechanical strength. In the case of such products manufactured, for instance, on the basis of a starch product, an important contribution to the mechanical strength of the molding is obtained by cross-linking arising during baking. As a result of damage to the skin during or after use, moisture, and hence bacteria, are given an opportunity to penetrate the product and break down the material of which the product is made, such as for instance starch, so that the product is compostible.

In illustration of possible process conditions: when using a flat baking form of 30 cm×40 cm for the manufacture of a molding from a dough, based on a starch product, which is introduced into the mold in a suspension form with about 50% water, while the final product after manufacture contains only about 8% water, and baking is to proceed at a mold temperature of about 300° C., a closing force of about 20,000N is to be applied and the distance between the land areas of the baking mold should be 0.1 mm at a maximum, but preferably less. At the same time, via small overflow apertures, not shown in the drawing, sufficient space is present to allow steam to escape.

When using baking molds for the manufacture of wafers, at delivery of the baking molds, tolerances in the thickness of the wafers of a few tenths of millimeters are specified, while the baking temperatures for these wafers are considerably lower, the space between the land areas is considerably greater and therefore the pressures arising are many times lower than in the manufacture of biodegradable products. In the known baking molds, the tolerances referred to are achieved by stiffening ridges provided on the arms, which are to counteract deformations of the mold parts, and are adversely affected during use by, for instance, wear of the mold arms, closing mechanisms and baking sections. If the stiffening ribs and the heavy, stiff construction of the other mold parts are present, the known mold is particularly heavy, certainly if the high temperatures and pressures referred to are to be resisted. Further, unacceptably high stresses arise in the mold parts, so that the risk of fracture with the associated disadvantages is particularly high. The tolerances normally achieved with baking molds are therefore not adequate for the manufacture of moldings which are not to be aftertreated, such a biodegradable dishes and the like.

Figure 5:
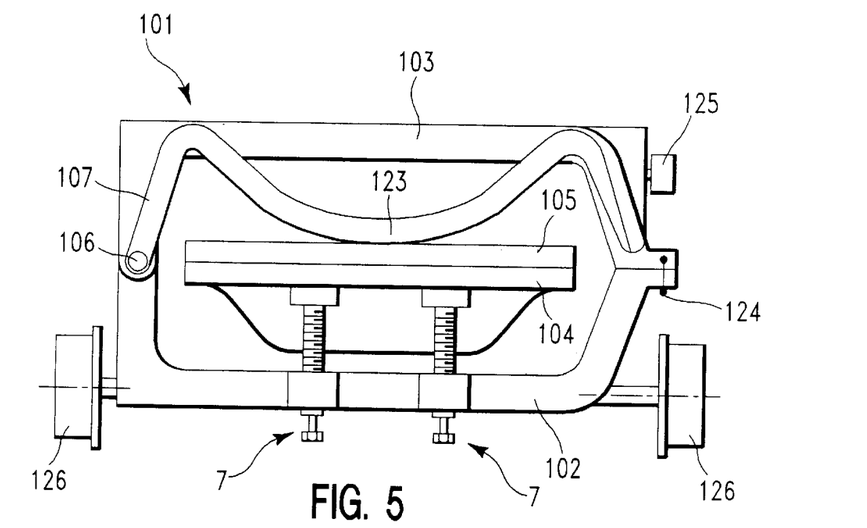
FIG. 5 shows central longitudinal sectional view of an alternative embodiment of a baking mold according to the invention, in closed position.
Figure 7:
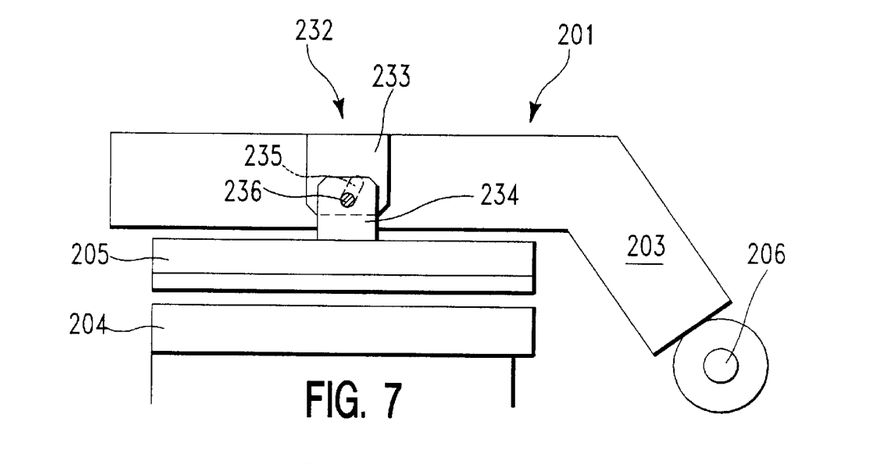
FIGS. 7, 8, and 9 show a stroke limiter in three successive closing stages of the baking sections.

Therefore, in the baking mold according to the invention, it has been chosen not to deliberately make the baking mold 1, 101, 210 at least partly of such stiff construction that deformations are always prevented. The force required for the closure of the baking form is at least substantially provided by the pressure means which are biased in the closing direction. At least one of the baking sections 4, 5, 104, 105, 204, 205 is movable relative to the associated arm 2, 3, 102, 103, 203 in the closing direction, so that any deformation of, for instance, one of the arms 2, 3, 102, 103, 203 is simply compensated without the baking sections 4, 5, 104, 105, 204, 205 being pushed further apart.

The baking mold 1 as shown in FIGS. 1 and 2 can be used as follows, for instance in a travelling-tray oven, a circular oven or a like oven for baking wafers and other moldings.

Before baking the moldings, the process conditions are determined. For instance, it is calculated how much dough per cycle is to be introduced into the mold, how much moisture the dough must contain for the desired flow pattern, what the necessary baking temperature and baking time are, what pressures will result therefrom between the baking sections, particularly as a result of steam evolution due to water evaporating from the dough, and what deformations will arise as a result of the heating of the baking mold. Based on the process data, it is determined at what pressure the baking sections are to be closed in order to obtain a final product with the desired properties.

The baking mold, preferably in cold condition, is set for use. This involves setting the bias, composed of a premounting bias and a set-up bias.

The premounting bias is set as follows.

At each pressure member 10 a suitable number of cup springs 11 are slid over the shank 16 and then the shank 16 is slipped through the adjusting ring 9. At the upper end 17 of the shank 16, a filler ring 30 of a suitable thickness is placed in the recess 29 and then the closing ring 19 is fixed by means of the adjustment bolt 18. Consequently, the filler ring 30 is clamped between the shank 16 and the closing ring 19, and the springs 11 are compressed, so that the premounting bias is obtained. As already stated, the thicker the filler ring 30, the lower the premounting bias. The closing ring 19 further prevents the shank 16 from falling from the adjusting ring 9 when opening the mold.

The set-up bias is set as follows.

Each pressure member 10, provided with the desired premounting bias, is connected with the relevant arm 2, 3 by screwing the adjusting ring 9 into the adjusting sleeve 8. The mold 1 is closed and the adjusting ring 9 is screwed into the adjusting sleeve 8 until the pressure plate 15 just abuts the relevant baking section 4, 5. This provides a connection between the baking section and the arm without set-up bias. Then the adjusting ring 9 is screwed further in the direction of the baking section 5. Thus if the baking sections are entirely pressed onto each other, the pressure member 10 is pressed back, so that the closing-ring-19 comes off the collar 28 and the cup springs 11 are compressed further. Thus the desired set-up bias is obtained. After setting the set-up bias, the retaining screw 27 is tightened, so that the adjusting ring 9 is deformed so that it can no longer turn relative to the adjusting sleeve 8.

On the basis of FIGS. 3 and 4 the setting of the set-up bias can be clearly understood. By screwing the adjusting ring 9 within the adjusting sleeve 8 from the condition without set-up bias further in the direction of the relevant baking section 4, 5, while the baking section 4 abuts against the baking section 5, the cup springs 11 are compressed, so that a set-up bias is obtained in the pressure means 7. The shank 16 is thereby pressed further through the adjusting ring 9, which gives rise to the distance i between the upper end 21 thereof, remote from the end face 14 of the adjusting ring 9, and the underside 22 of the closing ring 19 proximal to that upper end 21 (FIG. 4). The magnitude of the distance i is a direct measure for the extent of compression of the cup springs 11 and hence for the magnitude of the set-up bias in the pressure means 7 in question.

The pressure means according to the invention, of which an example is given in FIGS. 3 and 4, have a number of particular advantages. In addition to the above described adjustability, there is the advantage that the set-up bias measure i is independent of, for instance, the thickness of baking sections 4 and 5, respectively, any wear that may have developed and like factors. In fact, the set-up measure i is independent of the distance between the arm 2 and 3, respectively, and the baking section 4 and 5, respectively; if the baking section in question is, for instance, thinner than is usual, this means only that the adjusting ring 9 will be turned further into the adjusting sleeve 8 before the position is reached where the cup springs 11 without set-up bias are confined between the pressure plate 15 and the adjusting ring 9. Rotation of the adjusting ring to the desired set-up bias produces the usual change in position (distance i) and therefore the desired set-up bias again yields the known distance i. Since the desired premounting bias can also be unequivocally set, the overall bias, being the sum of the premounting bias and the set-up bias, can always be set correctly.

A further advantage of the pressure means 7 according to the invention is that if the baking form has accidentally not been emptied after completion of a cycle, and hence at the beginning of a next cycle a new amount of dough is introduced into the baking mold 1 while it is still filled, this has no particularly adverse consequences for the entire baking process, as is the case with the known baking molds.

If the baking form is provided with a double amount of dough, whether or not in partly baked condition, then in the known molds the pressure in the baking form rises to an unallowable extent. This means that if the baking mold can be closed then, fracture of mold parts will occur and/or the baking mold will spring open and otherwise the baking mold will remain open. In all cases, the baking oven comes to a standstill, so that the moldings in the baking molds in the oven will bake on, which makes subsequent cleaning requisite. Before that, the oven must first cool off, with all the consequences of production and energy loss.

In the baking mold according to the invention, if a double amount of dough is introduced, the two baking sections 4, 5 are pressed further apart, against the bias produced by the potential energy stored in the springs, so that the interspace between the land areas of the baking sections 4, 5 increases and thereby overpressure is prevented. This in turn prevents the occurrence of fracture of mold parts and moreover prevents the baking mold from opening prematurely. During the usual removal of the baked moldings at the end of a cycle, the double filled baking form is also emptied in the usual manner and again filled with a single load of dough. Accordingly, the oven need not be stopped at any time, so that only the contents of one baking mold in two cycles are lost, rather than the production of all baking molds during the time in which a large number of cycles could have been implemented. In particular with baking ovens with a large number of baking molds, this is of particularly great importance.

Also in the case of soiling of the land areas, for instance as a result of product residues having been left between them, the baking mold can still be closed, so that the production process need not be stopped for cleaning the baking mold.

As a consequence of the attachment of the baking sections by means of the pressure means 7, the baking mold 1 according to the invention, and in particular the arms 2, 3, can be made of lighter and simpler construction, so that the oven to be used can be made of lighter design as well. Moreover, heating this baking mold requires less energy than heating the known baking molds. As a result, a considerable saving of costs is realized, both in purchase and in the use of a wafer baking oven according to the invention.

Figure 6:
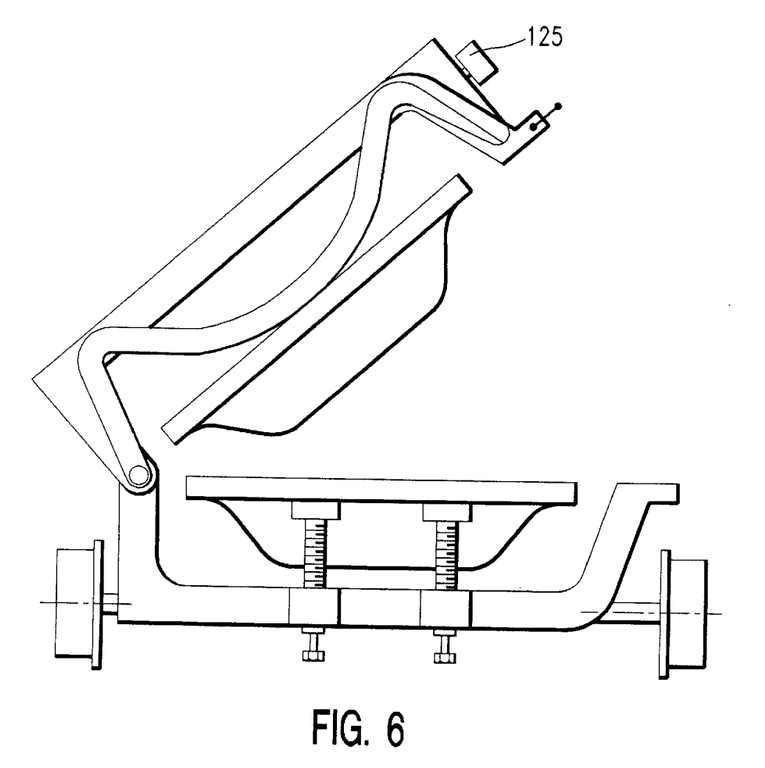
FIG. 6 shows the baking mold according to FIG. 5 in opened position.

FIGS. 5 and 6 show an alternative embodiment of the baking mold 101 according to the invention, where, in comparison with the above described baking mold 1 (FIGS. 1 and 2), the upper pressure means 7 have been replaced by an elastically deformable spring arm 107 and the lower baking section 105 is connected to the lower arm 102 by means of the above described pressure means 7. The spring arm 107 is pivotally connected to the pivot axis 106, which movably connects the lower arm 102 to the upper arm 103. When closing the baking mold 101, the upper arm 103 is brought into the closed position, whereafter the spring arm 107 is also pressed into the closed position and the closing mechanism 124 is closed. As a result, the central portion 123 comes to abut against the rear of the upper baking section 105. When the baking mold 101 is pressed shut, the spring arm 107, and in particular the central portion 123, is elastically deformed to some extent, so that a press-on force is exerted on the upper baking section 105 in the closing direction of the baking mold 101. This embodiment of a baking mold according to the invention has the advantage that it is of particularly simple construction, while yet the above-mentioned overpressure protection is maintained. Because the lower baking section 104 is connected to the lower arm 102 by means of the above-described pressure means 7, the bias can be set. It is naturally also possible to provide a setting possibility for the combined bias or at least for the set-up bias, for instance by making the pivot axis of the spring arm 107 movable in substantially vertical direction, independently of the pivot axis of the lower and upper arm 102, 103, or by adjusting the deformation characteristic of the spring arm 107.

Figure 8:
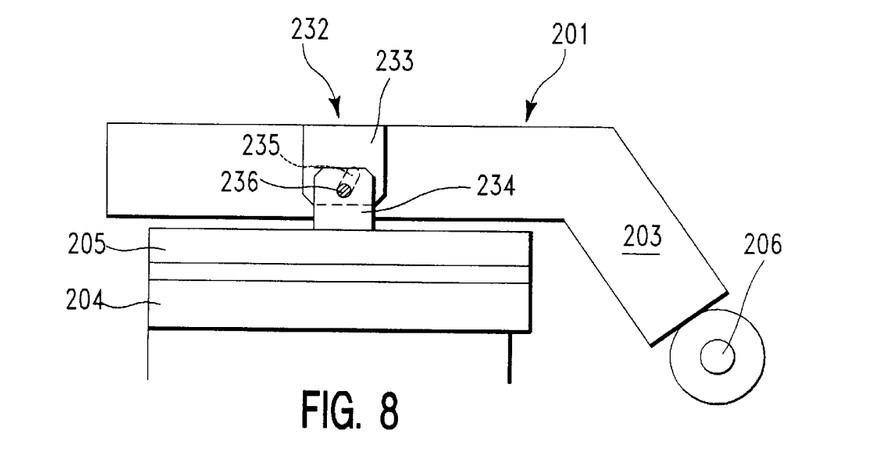
Figure 9:
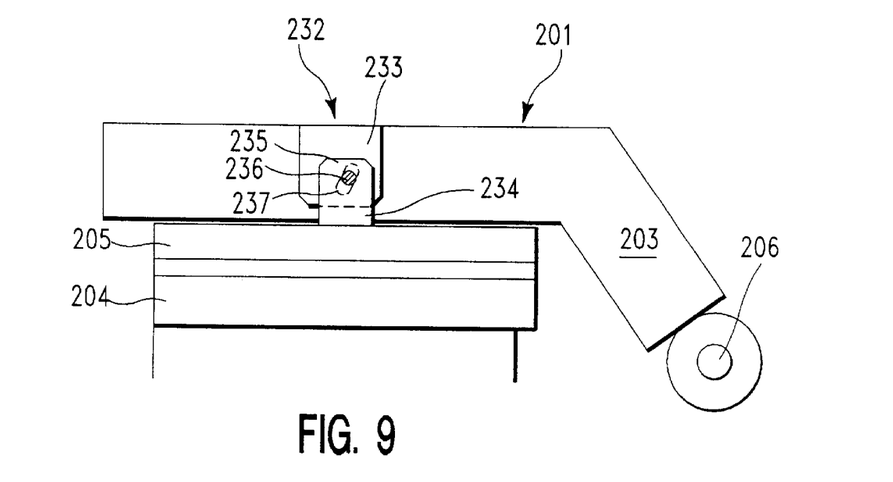

FIGS. 7, 8 and 9 show an alternative embodiment of the baking mold 201 according to the invention, in which the upper baking section 205 is suspended from the upper arm 203 for floating movement, by means of a provision comprising a stroke limiter 232, in three successive closing stages of the baking sections 204, 205. Due to the floating suspension, the centering of the two baking sections is simple to realize without giving rise to undue loading and wear of the baking mold. The stroke limiter 232 consists of a slotted plate 233 fixedly connected with the arm 203 and a pin plate 234 fixedly connected with the baking section 205. The slotted plate 233 and the pin plate 234 can move along each other in a plane parallel to the closing direction. The slotted plate 233 comprises a slot 235 having a slightly curved contour with its convex side proximal to the pivot 206. The pin plate 234 comprises a pin 236 extending from the pin plate 234 at right angles to the closing direction in the slot 235 with a proper guided fit. The contour of the slot 235 is such that the pivotal movement of the mold arm 203 about the pivot axis 206 is converted into a (vertical) translation of the baking section 205, so that the baking sections 204 and 205 during closing and opening of the baking mold 201 are moved relative to each other such that the two baking sections are in exact alignment. This is of great importance in particular when manufacturing products which are to be ready for use directly upon removal from the baking mold, i.e. without further aftertreatments. The lower end of the slot 235 is provided with an end cavity 237 in which the pin 236 is received when the mold is open. Then the pressure means 7, 107 still transmit a part of the bias to the baking section 205. This stroke limiter 232 connects the movable baking section with the relevant arm at all times and moreover has the advantage that the maximum stroke of the baking section relative to the arm remains limited. As a result, the springs in the pressure means are not maximally but only partly relieved when the mold is opened. Due to this reduction in the change in the load on the springs, the mechanical load on the mold and in particular on the pressure means is reduced considerably and hence their life is prolonged.

In a further alternative embodiment of the baking mold according to the invention, not shown in the drawings, the baking mold comprises individual heating means, preferably integrated into the baking mold, such as for instance an electric heating coil or a form of liquid heating. Thus the baking mold can also be used in a baking apparatus of a different kind, for instance an apparatus in which the baking molds are arranged at least substantially fixedly, with a dough injector and a removal station being moved along the baking molds.

The invention is not in any way limited to the exemplary embodiments described. Within the framework of the invention many variants are possible. For instance, the pressure means may be of different construction, for instance with screw or leaf springs, more of fewer pressure means can be used, and the closing bearings and stroke limiters together can be replaced by pins extending from each movable baking section, these pins being each mounted for movement in the closing direction, in a guiding bush fixedly connected to the adjacent arm, the possibility for the pins to move relative to the arm being adjustably limited. Thus both the stroke of the baking section can be limited and a connection between the arm and the baking section can be obtained.

As an overpressure protection, a pressure relief valve may be incorporated. Also, the baking mold can for instance comprise two or more upper arms and one lower arm and several baking sections, and the arms may be translatable relative to each other rather than pivotable. Further, the baking mold according to the invention also allows wafers and like molded products to be baked at lower temperatures and pressures, whereby the above-mentioned advantages are at least substantially achieved as well, so that the baking mold according to the invention is universally applicable, also in existing baking ovens.

We claim:

1. A baking mold for manufacturing moldings, the baking mold comprising:
   a) a lower arm;
   b) a lower baking section connected and corresponding to the lower arm;
   c) an upper arm, the upper arm being movable with respect to the lower arm such that the upper and lower arms may define an opened baking mold state and a closed baking mold state in which the upper arm may be fixed with respect to the lower arm;
   d) an upper baking section connected and corresponding to the upper arm, wherein the upper and lower baking sections assume a superposed condition in which at least one baking form is defined when the baking mold is in the closed state, and wherein at least one of the upper and lower baking sections is movably connected with a corresponding one of the upper arm and the lower arm; and
   e) means for providing a pressing bias on the at least one of the upper and lower baking sections in the closed state of the baking mold thus closing the baking form at least during normal use.

2. A baking mold according to claim 1 wherein the pressing bias is adjustable.

3. A baking mold according to claim 2 wherein the pressing bias may be set at room temperature.

4. A baking mold according to claim 1 wherein the means for providing a pressing bias include a plurality of springs.

5. A baking mold according to claim 4 wherein each of the plurality of springs includes a plurality of superposed cup springs.

6. A baking mold according to claim 4 wherein the means for providing a pressing bias further include a plurality of pressure members, each of the plurality of pressure members adapted to be pressed against the at least one of the upper and lower baking sections by a corresponding one of the plurality of springs.

7. A baking mold according to claim 6 wherein the means for providing a pressing bias further include an adjusting ring and an adjusting sleeve,
   wherein the adjusting sleeve is fixedly connected to the at least one of the upper and lower arms,
   wherein the pressure member comprises a shank extending through the adjusting ring,
   wherein the plurality of springs are confined around the shank between the pressure member and the adjusting ring,
   wherein the pressure member is movable relative to the adjusting sleeve such that a space occupied by the springs can be increased or reduced,
   wherein the adjusting ring is movable within the adjusting sleeve such that the distance between the at least one of the upper and lower baking sections and the adjusting ring can be increased or reduced.

8. A baking mold according to claim 1 wherein the means for providing a pressing bias comprise at least one elastically deformable spring arm.

9. A baking mold according to claim 8 wherein at least one end of the at least one elastically deformable spring arm is connected with at least one of the upper arm and the lower arm, and wherein a central portion of the at least one elastically deformable spring arm abuts against a side of one of the upper and lower baking sections remote from the baking form, while the spring arm is slightly deformed, such that the spring arm applies a bias pressing force to the one of the upper and lower baking sections in the closing direction of the baking mold.

10. A baking mold according to claim 1 wherein the baking mold further comprises:

f) an overpressure protection device arranged between at least one of the upper arm and the lower arm and a corresponding at least one of the upper baking section and the lower baking section such that if, when the baking mold is closed, a pressure between the upper and lower baking sections exceeds a pre-set value, the upper and lower baking sections are pressed apart without the upper and lower arms of baking mold thereby being opened.

11. A baking mold according to claim 1 further comprising:

f) individual heating means.

12. A baking mold according to claim 1 further comprising:

f) a stroke limiter, the stroke limiter
  i) limiting the movability of at least one of the upper and lower baking sections relative to a corresponding at least one of the upper and lower arms, at least in the closing direction, and
  ii) transmitting a part of the bias to the at least one of the upper and lower baking sections by the means for providing a pressing bias when the baking mold is opened.

13. A baking mold according to claim 1 wherein each of the upper and lower baking sections is mounted such that during the opening and closing of the baking mold, each of the upper and lower baking sections can move slightly in a direction perpendicular to a closing direction of the baking mold, and wherein the at least one of the upper and lower arms comprises means for guiding the upper and lower baking sections relative to each other during opening and closing of the baking mold.

14. A travelling-tray oven, in particular a wafer baking oven, comprising a plurality of baking molds, each of the baking molds comprising:

a) a lower arm;

b) a lower baking section connected and corresponding to the lower arm;

c) an upper arm, the upper arm being movable with respect to the lower arm such that the upper and lower arms may define an opened baking mold state and a closed baking mold state in which the upper arm may be fixed with respect to the lower arm;

d) an upper baking section connected and corresponding to the upper arm, wherein the upper and lower baking sections assume a superposed condition in which at least one baking form is defined when the baking mold is in the closed state, and wherein at least one of the upper and lower baking sections is movably connected with a corresponding one of the upper arm and the lower arm; and e) means for providing a pressing bias on the at least one of the upper and lower baking sections in the closed state of the baking mold thus closing the baking form at least during normal use.

15. A method for manufacturing starch-based moldings by means of a baking mold in an at least semicontinuous process, the method comprising steps of:

a) preparing a dough based on a starch product;

b) introducing the dough into an opened baking mold;

c) closing the baking mold, wherein the step of closing includes a sub-step of applying a bias force to a baking section of the baking mold;

d) passing the baking mold into an oven to bake the molding;

e) removing the baked molding from the baking form; and f) filling the baking mold again.

16. A method according to claim 15 further comprising a step of:

setting, before use, the bias desired during use when closing the baking mold such that when a maximum allowable pressure between the baking sections of the baking mold is exceeded, these baking sections are pressed apart without damage to the baking mold or oven parts, no overpressure arises in the baking mold and the baking mold is not prematurely opened.

* * * * *